(12) United States Patent
Kitagawa et al.

(10) Patent No.: US 12,424,683 B2
(45) Date of Patent: Sep. 23, 2025

(54) METHOD OF MANUFACTURING METAL-AIR BATTERY

(71) Applicant: SHARP KABUSHIKI KAISHA, Sakai (JP)

(72) Inventors: Tomo Kitagawa, Sakai (JP); Hirotaka Mizuhata, Sakai (JP); Shunsuke Sata, Sakai (JP); Keigo Mitamura, Sakai (JP); Akihito Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 505 days.

(21) Appl. No.: 18/014,426

(22) PCT Filed: Jun. 24, 2021

(86) PCT No.: PCT/JP2021/023931
§ 371 (c)(1),
(2) Date: Jan. 4, 2023

(87) PCT Pub. No.: WO2022/009687
PCT Pub. Date: Jan. 13, 2022

(65) Prior Publication Data
US 2023/0344039 A1 Oct. 26, 2023

(30) Foreign Application Priority Data
Jul. 10, 2020 (JP) .................................. 2020-119407

(51) Int. Cl.
*H01M 12/08* (2006.01)

(52) U.S. Cl.
CPC ................................ *H01M 12/08* (2013.01)

(58) Field of Classification Search
CPC ... H01M 50/00–77; H01M 12/00–085; H01M 10/00–667
See application file for complete search history.

(56) References Cited

U.S. PATENT DOCUMENTS

| 2010/0112454 | A1* | 5/2010 | Visco | H01M 4/366 |
| | | | | 429/246 |
| 2013/0216921 | A1* | 8/2013 | Maloney | H01M 12/06 |
| | | | | 307/43 |
| 2022/0149479 | A1* | 5/2022 | Naka | H01M 50/403 |

FOREIGN PATENT DOCUMENTS

JP 2014238985 A 12/2014

* cited by examiner

*Primary Examiner* — Bach T Dinh
(74) *Attorney, Agent, or Firm* — ScienBiziP, P.C.

(57) ABSTRACT

As a method of manufacturing a metal-air battery, a first step is included of stacking an exterior body (e.g., first resin film 11), a water-repellent film (14), and a positive electrode (e.g., air electrode 15) in the stated order. The first step includes: a fusing step of fusing the exterior body and the water-repellent film (14); and a compression step of compressing the water-repellent film (14) and the positive electrode. The fusing step fuses the exterior body and the water-repellent film (14). After the first step, a portion of the exterior body is removed from inside the fusing portion (141) formed in the fusing step, to form an opening (e.g., air inlet 111) in the exterior body.

13 Claims, 17 Drawing Sheets

A-A

B-B

METHOD OF MANUFACTURING METAL-AIR BATTERY

TECHNICAL FIELD

The present disclosure relates to a method of manufacturing a metal-air battery.

BACKGROUND ART

Various metal-air batteries have been proposed that include a stack of a positive electrode and a negative electrode inside an exterior body. For instance, Patent Literature 1 discloses a lithium-air battery including a positive-electrode terminal and a sheet-like, carbon fiber-containing air-electrode current collector.

For this type of lithium-air battery, it is proposed to provide: a laminated film formed like a window frame with an opening at the center of the laminated film; and a water-resistant and breathable porous resin between the laminated film and the air-electrode current collector exposed out of the opening. The porous resin has a peripheral end portion thermally fused to the outer surface of the laminated film, to restrain an electrolytic solution from decreasing in amount due to evaporation.

CITATION LIST

Patent Literature

Patent Literature 1: Japanese Unexamined Patent Application Publication, Tokukai, No. 2014-238985

SUMMARY OF INVENTION

Technical Problem

FIG. 18A is a cross-sectional diagram illustrating a method of manufacturing a conventional metal-air battery. FIG. 18B is a cross-sectional diagram illustrating a metal-air battery manufactured by a conventional method. In this conventional metal-air battery, as shown in FIG. 18A, a laminated film 91 with a preformed opening, porous resin 92, and an air-electrode current collector 93 are stacked and thermally pressed in pressurization direction P for formation. Hence, the peripheral end portion of the porous resin 92 is compressed between the laminated film 91 and the air-electrode current collector 93.

However, as shown in FIG. 18B, the porous resin 92 is sandwiched between an opening 911 in the laminated film 91 and the air-electrode current collector 93. The porous resin 92 is therefore susceptible to break under pressure, which may be a cause for damage, and could also allow leakage of an electrolytic solution through the damaged parts.

The present disclosure has been made in view of these problems and has an object to provide a method of manufacturing a metal-air battery that can restrain leakage of an electrolytic solution by preventing damage to a water-repellent film adhered to an exterior body.

Solution to Problem

To address the problems, the present disclosure, in an aspect thereof, is directed to a method of manufacturing a metal-air battery, the method including a first step of stacking an exterior body, a water-repellent film, and a positive electrode in a stated order, the first step including: a fusing step of fusing the exterior body and the water-repellent film; and a compression step of compressing the water-repellent film and the positive electrode, the fusing step fusing, in a frame shape, a region of the exterior body and the water-repellent film where the exterior body and the water-repellent film overlap, and the method including, after the first step, an opening forming step of forming an opening in the exterior body by removing a part of the exterior body from inside a frame-shaped fusing portion formed in the fusing step.

Additionally, in the method of manufacturing a metal-air battery, the positive electrode preferably includes a catalyst layer capable of reducing oxygen. In addition, the positive electrode preferably includes a positive-electrode current collector in contact with the catalyst layer.

Additionally, the method of manufacturing a metal-air battery may in an aspect thereof be configured such that the exterior body includes a first exterior body and a second exterior body, the water-repellent film includes a first water-repellent film and a second water-repellent film, the positive electrode includes a first positive electrode and a second positive electrode, the first step stacks the first exterior body, the first water-repellent film, and the one positive electrode in a stated order and stacks the second exterior body, the second water-repellent film, and the two positive electrodes in a stated order, the fusing step includes: a first fusing step of fusing the first exterior body and the first water-repellent film; and a second fusing step of fusing the second exterior body and the second water-repellent film, the compression step includes: a first compression step of compressing the first water-repellent film and the first positive electrode; and a second compression step of compressing the second water-repellent film and the second positive electrode, the first fusing step fuses, in a frame shape, a region of the first exterior body and the first water-repellent film where the first exterior body and the first water-repellent film overlap, the second fusing step fuses, in a frame shape, a region of the second exterior body and the second water-repellent film where the second exterior body and the second water-repellent film overlap, the opening forming step includes, after the first step, an opening forming step of forming a first opening and a second opening in the first exterior body and the second exterior body by removing a part of the first exterior body and a part of the second exterior body respectively from inside the frame-shaped fusing portion formed in the fusing step, and additionally, the sealing step seals the first exterior body and the second exterior body.

These configurations enable manufacturing the metal-air battery with an opening in the exterior body without damaging the water-repellent film, thereby restraining leakage of the electrolytic solution.

Advantageous Effects of Invention

These configurations enable fusing the exterior body and a water-repellent film in the fusing step without damaging the water-repellent film and allows for thereafter providing an opening in the exterior body, thereby restraining leakage of the electrolytic solution through the opening.

DESCRIPTION OF EMBODIMENTS

Figure 1:
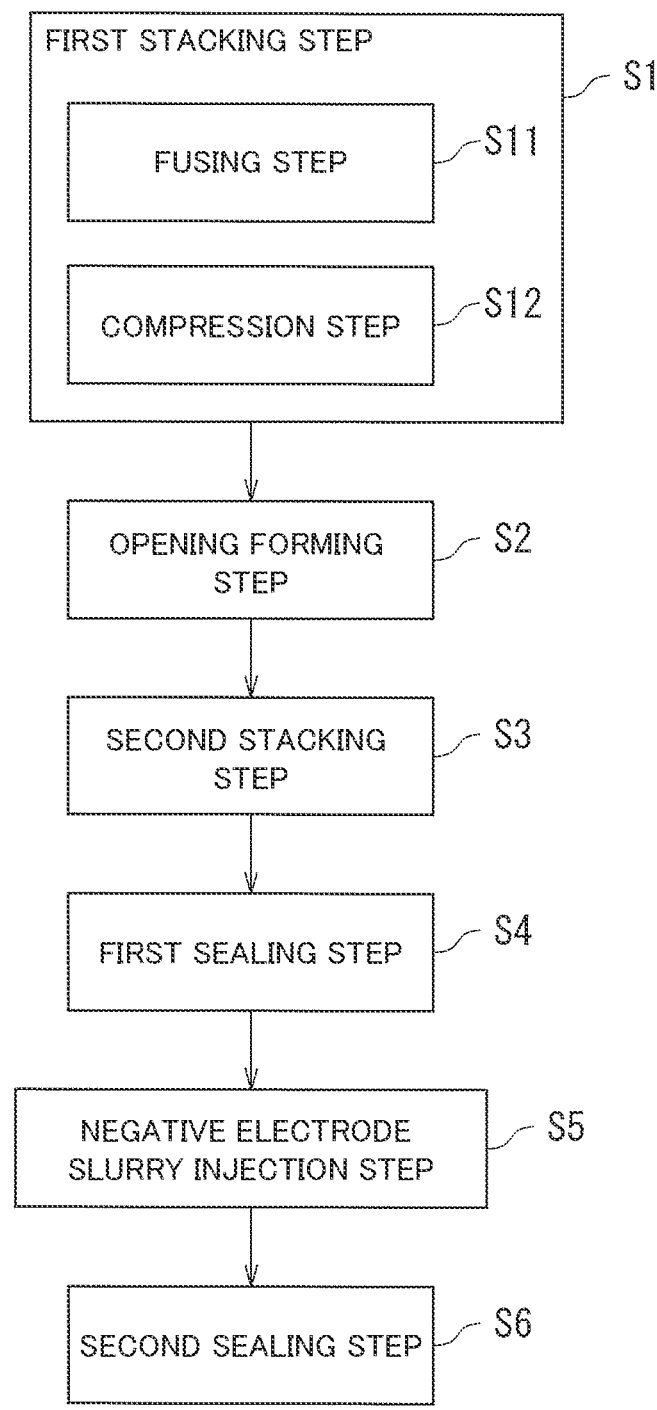
FIG. 1 is a flow chart representing steps in a method of manufacturing a metal-air battery in accordance with the present disclosure.

The following will describe methods of manufacturing a metal-air battery in accordance with embodiments of the present disclosure with reference to drawings.

Embodiment 1

FIGS. 1 to 11 illustrate a method of manufacturing a metal-air battery in accordance with Embodiment 1 of the present disclosure. FIGS. 12A and 12B illustrate an example of a metal-air battery manufactured by the method of manufacturing a metal-air battery in accordance with the present disclosure. Note that the cross-sectional views do not show hatching indicating cross-sections of structural members such as a first resin film 11 and a water-repellent film 14 for a better view.

Embodiment 1 will describe a method of manufacturing a metal-air battery 10 including the gas-liquid separating, water-repellent film 14 between an air electrode 15 as a positive electrode and a battery container 13 as an exterior body. Prior to this description of the method, a brief description is now given of the metal-air battery 10.

FIG. 12A is a plan view of the metal-air battery 10. FIG. 12B is a cross-sectional view taken along line A-A in FIG. 12A. As shown in these figures, the battery container (exterior body) 13 of the metal-air battery 10 is formed by attaching the first resin film 11 and a second resin film 12 together. The battery container 13 contains the air electrode 15, a metal negative electrode 16, a separator 18, and the water-repellent film 14. The battery container 13 also contains an electrolytic solution (not shown). The first resin film 11 and the second resin film 12 are made from a common resin film.

The separator 18 is disposed facing the first resin film 11 and has a peripheral portion adhered to a peripheral portion of the first resin film 11. The air electrode 15 and the water-repellent film 14 are contained between the first resin film 11 and the separator 18.

The first resin film 11 has formed therethrough an air inlet 111 that is an opening for feeding air (oxygen). The water-repellent film 14 is adhered to the air inlet 111. The air electrode is disposed between the water-repellent film 14 and the separator 18. The water-repellent film 14 is a film that both repels and passes air.

The second resin film 12 is disposed facing the separator 18 on a side opposite the first resin film 11. The second resin film 12 has a peripheral portion adhered to a peripheral portion of the separator 18. The peripheral portion of the second resin film 12 is preferably adhered also to a peripheral portion of the first resin film 11. The metal negative electrode 16 is contained between the second resin film 12 and the separator 18.

The air electrode 15 includes a positive-electrode current collector 151 and a catalyst layer 152 that is in contact with the positive-electrode current collector 151, so that the air electrode 15 can be an oxygen-reducing and -generating positive electrode. The positive-electrode current collector 151 is partially extended out of the battery container 13 to form a lead portion 153 of the metal-air battery 10. The positive-electrode current collector 151 is not limited in any particular manner so long as the positive-electrode current collector 151 is made of a material used generally in the metal-air battery field. In addition, the positive-electrode current collector 151 preferably has a thickness of from 0.05 mm to 0.5 mm.

The catalyst layer 152 contains at least a catalyst. The catalyst has at least an oxidizing and reducing capability. Examples of such catalysts with oxidizing and reducing capability include electrically conductive carbon materials such as ketjen black, acetylene black, denka black, carbon nanotubes, and fullerenes; metals such as platinum; metal oxides such as manganese dioxide; metal hydroxides; and metal sulfides. Any one of these materials may be used alone; alternatively, two or more of them may be used in combination.

Hence, a three-phase interface where gaseous oxygen, water, and electrons coexist can form on the catalyst, which in turn enables the progress of a discharge reaction. Additionally, when the metal-air battery 10 is a secondary battery, the catalyst layer 152 may contain not only an oxygen-reducing catalyst, but also an oxygen-generating catalyst, or may contain an oxygen-generating and -reducing catalyst. The catalyst layer 152 preferably has a thickness of from 0.1 mm to 1.0 mm, both inclusive. Apart from catalysts, the catalyst layer 152 may contain an electrically conducting auxiliary agent such as carbon and/or a binding agent that is(are) used generally in the associated field.

The metal negative electrode 16 is contained between the second resin film 12 and the separator 18, with a current collector 161 being stacked on an active material layer 162. The current collector 161 and a particulate negative-electrode active material (e.g., zinc or zinc oxide) may be separately introduced and stacked. In addition, the metal negative electrode 16 may contain a colloidal slurry of a mixture of the current collector 161, a particulate negative-electrode active material, and an electrolytic solution. The slurry preferably contains the electrolytic solution and the negative-electrode active material at a ratio of from 0.3:1 to 2.0:1 by weight.

The negative-electrode active material is selected in a suitable manner from materials used generally in the metal-air battery field. For instance, the negative-electrode active material may be a metal species such as a cadmium species, a lithium species, a sodium species, a magnesium species, a lead species, a zinc species, a tin species, an aluminum species, or an iron species. The negative-electrode active material may be in the form of a metal oxide because the negative-electrode active material is reduced when charged.

The negative-electrode active material has an average particle diameter of preferably from 1 nm to 500 μm, more preferably from 5 nm to 300 μm, even more preferably from 100 nm to 250 μm, and particularly preferably from 200 nm to 200 μm. The average particle diameter can be measured using a particle counter.

The electrolytic solution is selected in a suitable manner depending on the metal species used as the negative-electrode active material. As an example, when the negative-electrode active material is a zinc species, the electrolytic solution may be an alkaline aqueous solution of, for example, potassium hydroxide. As another example, when the negative-electrode active material is a magnesium species or an iron species, the electrolytic solution may be a neutral aqueous solution such as an aqueous solution of sodium chloride. As a further example, when the negative-electrode active material is a lithium species or a sodium species, the electrolytic solution may be a non-aqueous electrolytic solution used generally in the associated field.

The current collector 161 is partially extended out of the battery container 13 to form a lead portion 163 of the metal-air battery 10. The current collector 161 preferably has a thickness of from 0.05 mm to 0.50 mm. The active material layer 162 preferably has a thickness of from 1.0 mm to 10.0 mm.

Note that in the metal-air battery 10, the air electrode 15, the metal negative electrode 16, the separator 18, and the electrolytic solution may be those used conventionally in the laminated battery and metal-air battery fields.

The resin film as the first resin film 11 and the second resin film 12 has a thickness that is not limited in any particular manner, but that is preferably from 0.02 mm to 0.25 mm. If the resin film has a thickness of less than 0.02 mm, the resin film does not sufficiently melt, therefore possibly failing to deliver sufficient joint strength, when the first resin film 11 and the second resin film 12 are fused. On the other hand, if the resin film has a thickness in excess of 0.25 mm, the resin film does not readily expand, therefore possibly more likely causing a stress concentration in a fusing portion when the battery expands.

Such a resin film is preferably made of a thermoplastic resin material that has excellent alkaline resistance and may be a polyolefin-based resin film such as a polypropylene film or a polyethylene film or a stack of any of these resin films. Note that for the purpose of reinforcement, the first resin film 11 may be stacked with either a resin film layer such as a nylon film layer or a polyethylene terephthalate film layer or a metal film layer such as an aluminum foil layer or a stainless steel foil layer.

Method of Manufacturing Metal-Air Battery

FIG. 1 is a flow chart representing a method of manufacturing a metal-air battery in accordance with the present embodiment. A method of manufacturing the metal-air battery 10 in accordance with the present embodiment includes a plurality of steps as shown in the figure.

First, the first resin film 11 (exterior body), the water-repellent film 14, and the air electrode 15 (positive electrode) are stacked in this order (first stacking step S1: first step). This first stacking step S1 includes a fusing step S11 of fusing the first resin film 11 and the water-repellent film 14 together and a compression step S12 of compressing the water-repellent film 14 and the air electrode 15 together.

Figure 2:
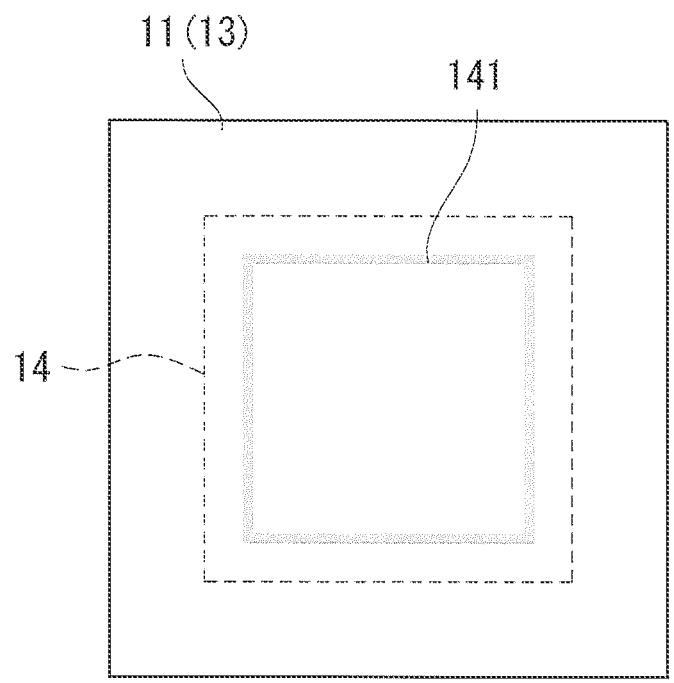
FIG. 2 is a plan diagram illustrating a compression step in a first stacking step in the method of manufacturing a metal-air battery in accordance with Embodiment 1.

FIG. 2 is a plan diagram illustrating the compression step S12 in the first stacking step S1. In the fusing step S11, the first resin film 11 and the water-repellent film 14 are placed one on top of the other and then fused together. A fusing portion 141 is hence formed on the first resin film 11 and the water-repellent film 14, adhering the first resin film 11 and the water-repellent film 14 together. In the fusing step S11, the first resin film 11 is yet to have the air inlet 111 and has a flat and smooth plane.

The fusing portion 141 is formed by fusing the overlapping portions of the first resin film 11 and the water-repellent film 14 in a frame shape. In the fusing step S11, the first resin film 11 and the water-repellent film 14 may be fused by any method including, for example, thermal fusing or ultrasonic fusing.

Figure 3:
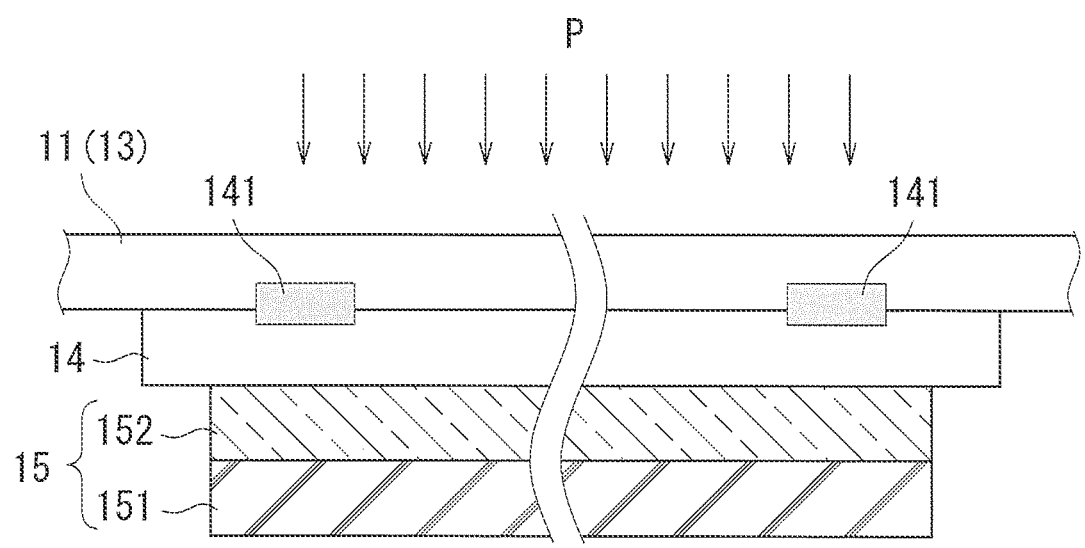
FIG. 3 is a cross-sectional diagram illustrating the compression step in the first stacking step.

FIG. 3 is a schematic cross-sectional diagram illustrating the compression step S12 in the first stacking step S1. In the compression step S12, the water-repellent film 14, the oxygen-reducing, sheet-like catalyst layer 152, and the positive-electrode current collector 151 are stacked in this order and then compressed from above. In this stacking and compression, the first resin film 11 and the water-repellent film 14 may have been already fused, forming the fusing portion 141, as shown in FIG. 3. In the illustrated example, the first resin film 11, the water-repellent film 14, the catalyst layer 152, and the positive-electrode current collector 151 are placed one on top of the other in this order when viewed from top to bottom and then pressurized under pressure P from above. Hence, the sheet-like catalyst layer 152 and the positive-electrode current collector 151 are compressed together in a location overlapping the water-repellent film 14.

Note that the catalyst layer 152 and the positive-electrode current collector 151, both of which are a part of the air electrode 15, are preferably compressed in advance before the fusing step S11 or before the first stacking step S1. In addition, in the first stacking step S1, the sequence of the fusing step S11 and the compression step S12 is not limited; either step can be implemented first.

Figure 4:
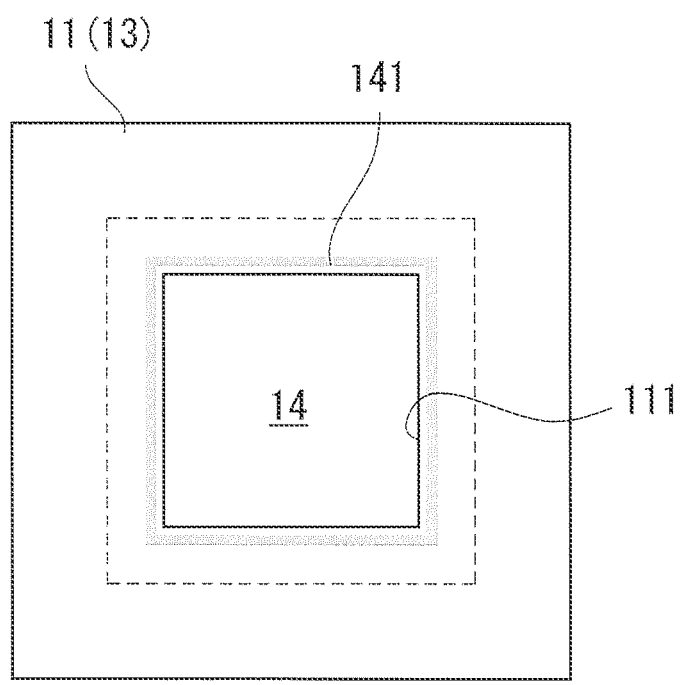
FIG. 4 is a plan diagram illustrating an opening forming step in the method of manufacturing a metal-air battery.
Figure 5:
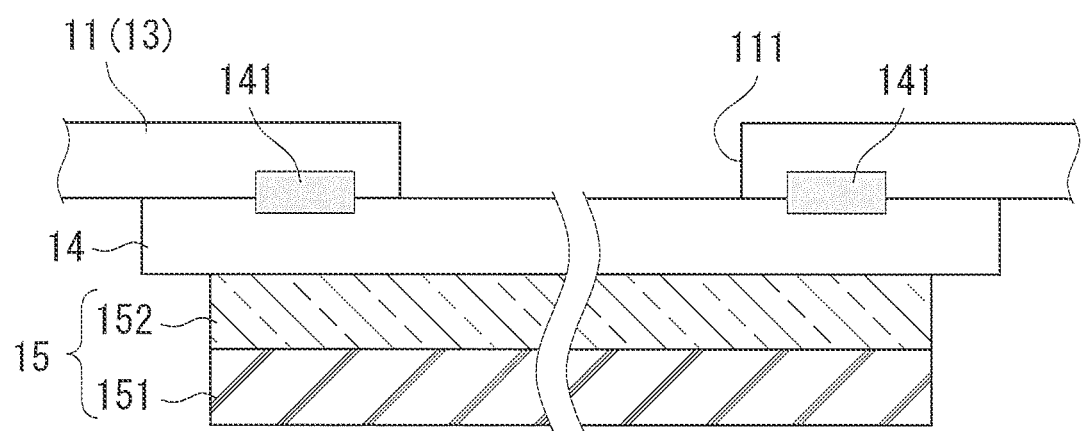
FIG. 5 is a cross-sectional diagram illustrating the opening forming step in the method of manufacturing a metal-air battery.

Referring to FIG. 1, after the first stacking step S1, the first resin film 11 is partially removed from inside the frame-shaped fusing portion 141 formed in the fusing step S11, to provide the air inlet (opening) 111 in the first resin film 11 (opening forming step S2). FIGS. 4 and 5 schematically illustrate the condition after the opening forming step S2 is completed, FIG. 4 being a plan diagram, FIG. 5 being a cross-sectional diagram.

Referring to FIG. 2, in the fusing step S11, the frame-shaped fusing portion 141 is formed on the first resin film 11 and the water-repellent film 14. From this condition, as shown in FIG. 4, a rectangular portion of the first resin film 11 is removed from inside the frame-shaped fusing portion 141. The air inlet 111 can be hence formed in the first resin film 11.

Consequently, the water-repellent film 14, which underlies this first resin film 11, is exposed in the air inlet 111 in the first resin film 11. By removing the first resin film 11 from inside the fusing portion 141, the air inlet 111 can be formed without damaging the fusing portion 141 on the water-repellent film 14 and the first resin film 11.

Figure 6A:
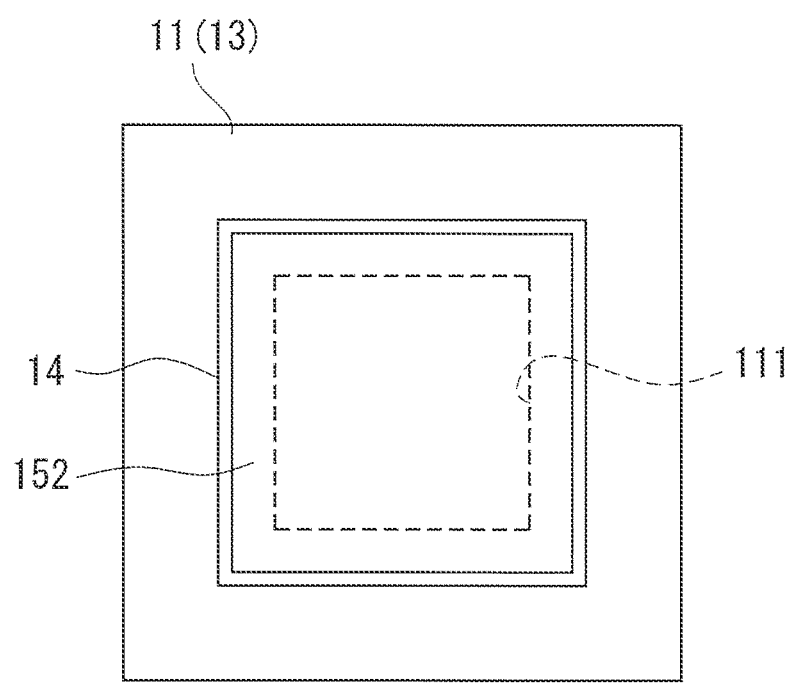
FIG. 6A is a plan diagram of a face opposite a first resin film in FIG. 4, showing a layout of a catalyst layer.
Figure 6B:
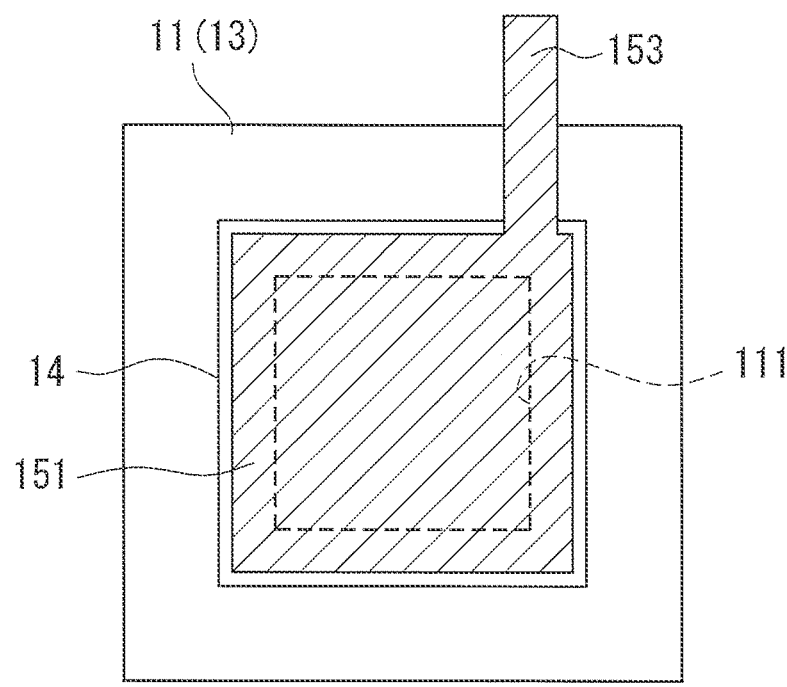
FIG. 6B is a plan diagram of a face opposite the first resin film in FIG. 4, showing a layout of a positive-electrode current collector.

FIGS. 6A and 6B are plan diagrams of a face opposite the first resin film 11 shown in FIG. 4, showing a layout of the sheet-like catalyst layer 152 and the positive-electrode current collector 151. The water-repellent film 14 is adhered to the first resin film 11 via the fusing portion 141 and positioned covering the air inlet 111 from the inside. The positive-electrode current collector 151 is partially extended out of the first resin film 11. This extension serves as the lead portion 153 of the metal-air battery 10.

Figure 7A:
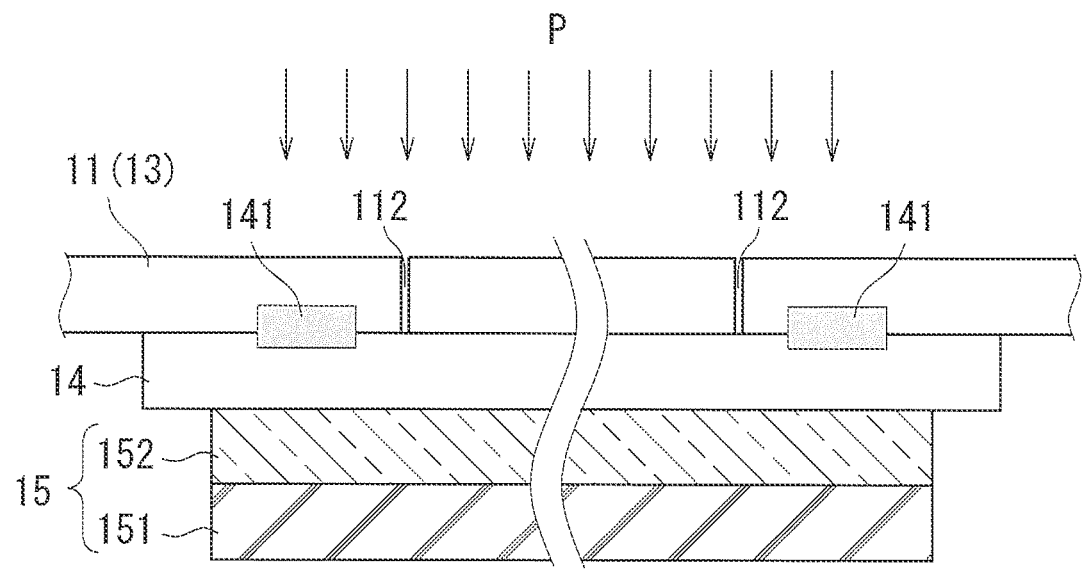
FIG. 7A is a cross-sectional diagram illustrating an example of pre-processing for the opening forming step.
Figure 7B:
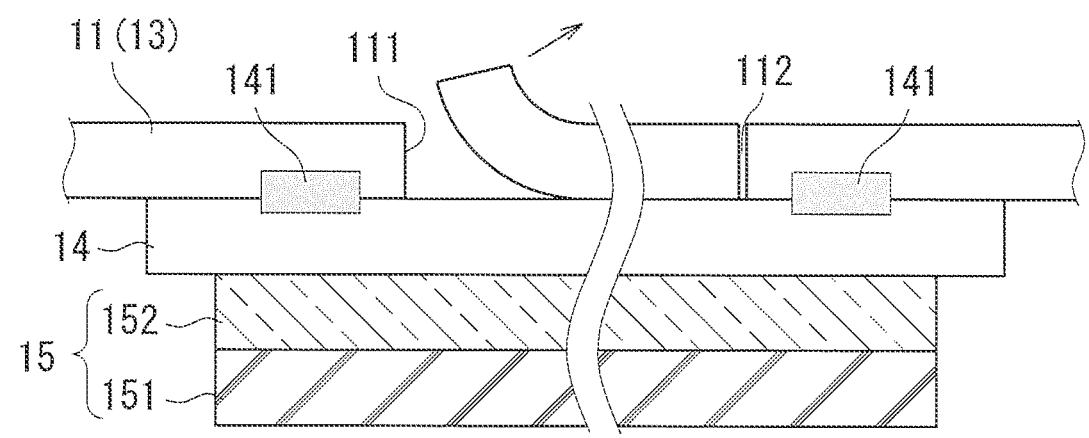
FIG. 7B is a cross-sectional diagram illustrating post-processing for FIG. 7A as an example of the opening forming step.

In addition, as a preparation for the provision of the air inlet 111, an opening-providable region that can be removed is preferably designated in advance in the first resin film 11. FIG. 7A is a cross-sectional diagram illustrating an example of pre-processing for the opening forming step. FIG. 7B is a cross-sectional diagram illustrating an opening forming step which is post-processing for FIG. 7A. Referring to FIG. 7A, as an example, a fabrication line 112 such as perforations or a slit is preferably made in advance around the opening-providable region of the first resin film 11 before the first resin film 11, the water-repellent film 14, the catalyst layer 152, and the positive-electrode current collector 151 are placed one on top of the other in that condition. This fabrication line 112 such as perforations or a slit is preferably made along, for example, the rectangular broken line shown on the air inlet 111 in FIGS. 6A and 6B.

In the fusing step S11, the first resin film 11 and the water-repellent film 14 are fused together outside the opening-providable region to form the fusing portion 141. In addition, in the compression step S12, the water-repellent film 14, the catalyst layer 152, and the positive-electrode current collector 151 are compressed by compressing a region that includes the opening-providable region. Hence, workability is improved in the first stacking step S1 including the fusing step S11 and the compression step S12. Thereafter, as shown in FIG. 7B, in the opening forming step S2, the first resin film 11 is removed along the fabrication line 112 such as perforations or a slit around the opening-providable region. Hence, the air inlet 111 can be readily formed in a suitable location without damaging the water-repellent film 14.

Figure 8:
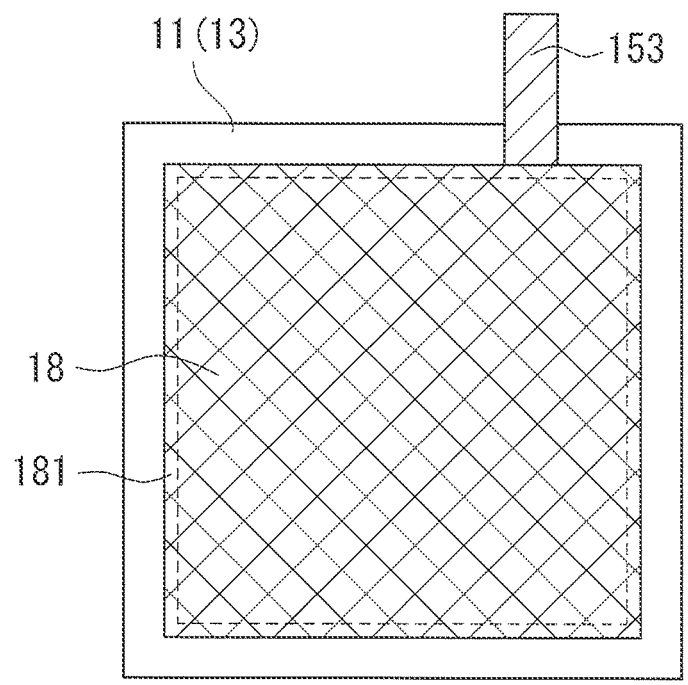
FIG. 8 is a plan diagram illustrating a second stacking step in the method of manufacturing a metal-air battery.
Figure 9:
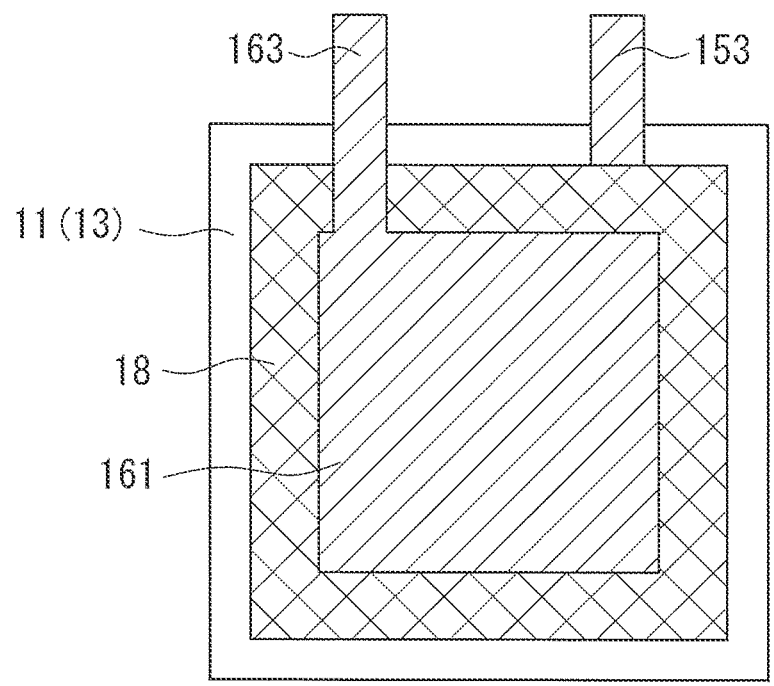
FIG. 9 is a plan diagram illustrating the second stacking step.

FIGS. 8 and 9 are plan diagrams illustrating a second stacking step S3. In the second stacking step S3, the separator 18 is stacked on the air electrode 15 and adhered to the first resin film 11 by, as a preferable example, thermal fusing or other like fusing, thereby forming an adhesion region 181 on an outer circumference of the separator 18. The separator 18 has a larger area than the water-repellent film 14, so that only the separator 18 and the first resin film 11 are placed one on top of the other in the adhesion region 181. The ratio of the area of the separator 18 to the area of the first resin film 11 including the opening area of the air inlet 111 is preferably from 0.55 to 0.95. Next, as shown in FIG. 9, as the second stacking step S3, the current collector 161 for the metal negative electrode 16 is stacked on the separator 18.

Figure 10:
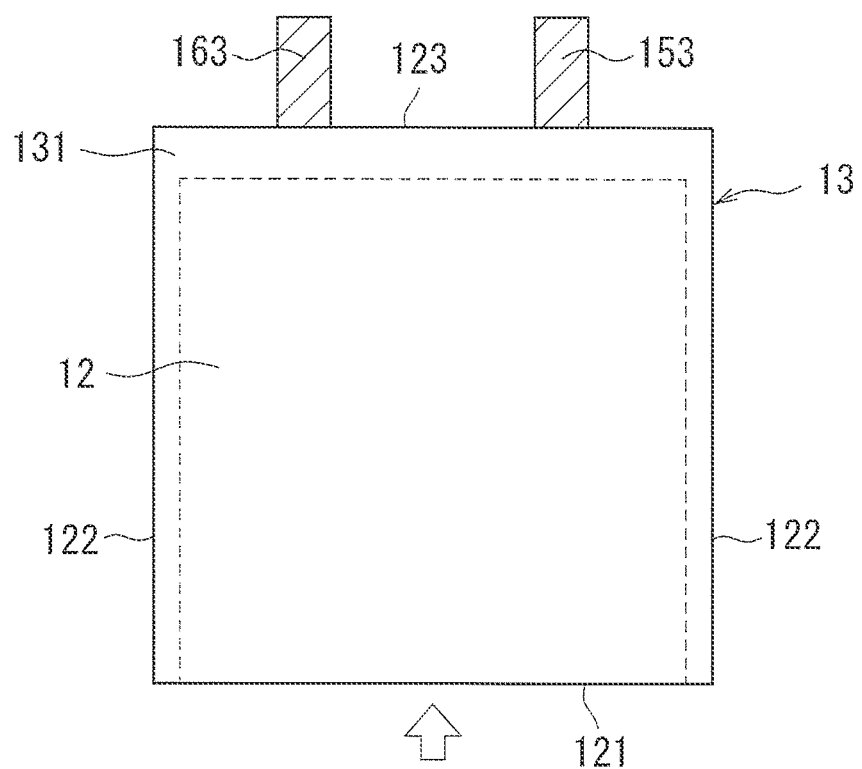
FIG. 10 is a plan diagram illustrating a first sealing step in the method of manufacturing a metal-air battery.

FIG. 10 is a plan diagram illustrating a first sealing step S4. In the first sealing step S4, the second resin film 12 is stacked so as to face the current collector 161 for the metal negative electrode 16 shown in FIG. 9. Next, as shown in FIG. 10, adhesion regions 131 on three sides including a top side 123 are adhered. FIG. 10 shows an example where the three sides (not including a bottom side 121) are adhered. This is however not the only possible implementation of the invention. Alternatively, the three sides (including the top side 123, one of lateral sides 122, and the bottom side 121, but not including another lateral side 122) may be adhered together. In the adhering, on the sides other than the top side 123, those portions where at least the resin films (the first resin film 11 and the second resin film 12) are placed one on top of the other are fused together. In addition, on the top side 123, those portions where at least the first resin film 11, the second resin film 12, a positive-electrode lead portion 153, and a negative-electrode lead portion 163 are placed one on top of the other are fused together. Hence, the first resin film 11 and the second resin film 12 are sealed on the three overlapping sides (first sealing step S4).

Next, as shown in FIG. 10, a negative electrode slurry is injected through an opening on the bottom side 121 where the resin films are not fused (negative electrode slurry injection step S5). The negative electrode slurry may include zinc particles and an electrolytic solution.

Figure 11:
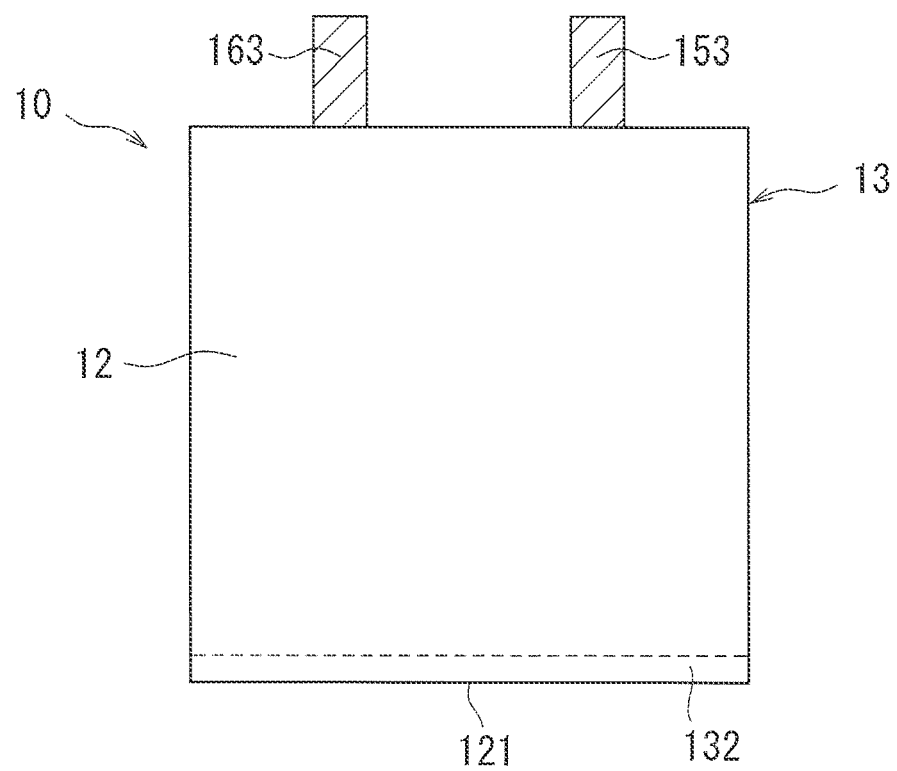
FIG. 11 is a plan diagram illustrating a second sealing step in the method of manufacturing a metal-air battery.
Figure 12A:
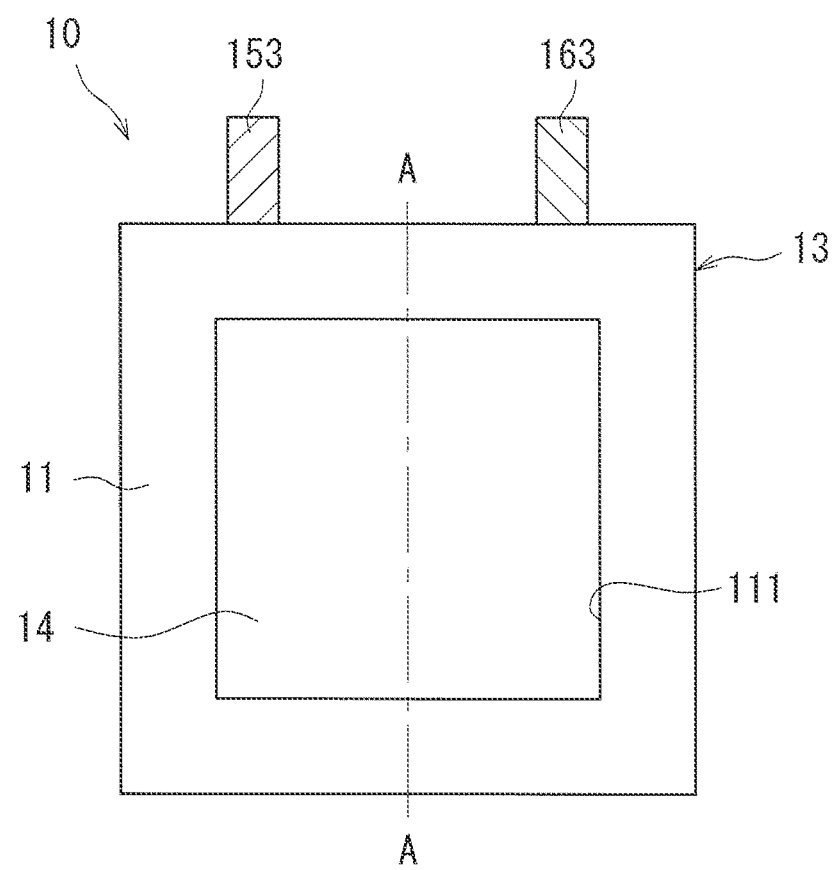
FIG. 12A is a plan diagram of an example of a metal-air battery manufactured by the method.
Figure 12B:
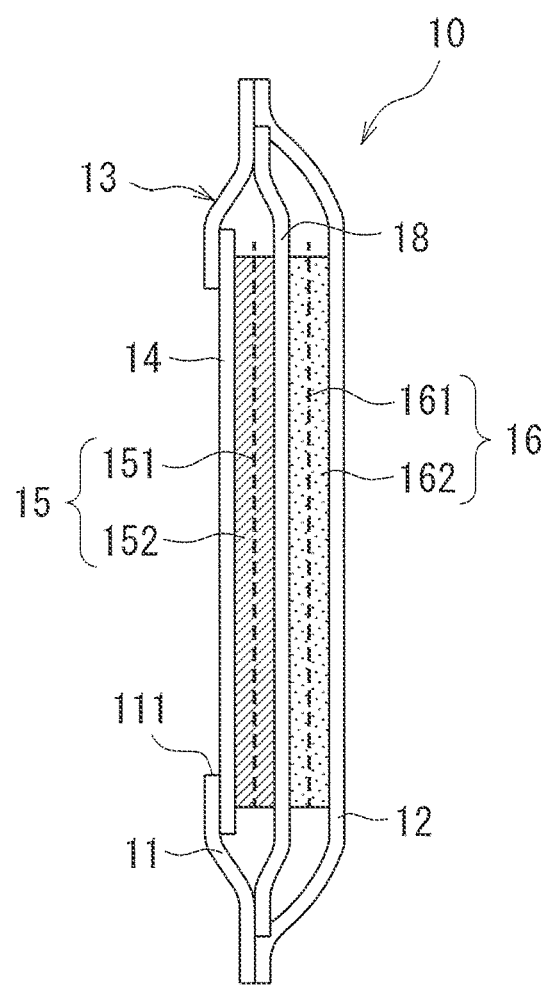
FIG. 12B is a cross-sectional view taken along line A-A in FIG. 12A.

FIG. 11 is a plan diagram illustrating a second sealing step S6. The bottom side 121 (adhesion region 132), through which the negative electrode slurry was injected in the pre-processing, is sealed by fusing (second sealing step S6: second step). In this step, the introduced negative electrode slurry does not enter the empty space between the first resin film 11 and the separator 18 because the separator 18 is already adhered to the first resin film 11. The portions of the resin films (first resin film 11 and second resin film 12) where the resin films overlap each other are fused together on the bottom side 121. The electrolytic solution permeates the separator 18, reaching the air electrode 15. The battery container 13 is integrally formed by sealing the first resin film 11 and the second resin film 12 together in the second sealing step S6. Hence, the metal-air battery 10 is obtained as shown in FIGS. 12A and 12B.

In this method of manufacturing the metal-air battery 10, the water-repellent film 14 is adhered in the compression step S12 without needing to form in advance the air inlet 111 in the first resin film 11 which is a part of the exterior body (see FIG. 7A), and after the compression step S12, the air inlet 111 is formed (see FIG. 7B). Therefore, the water-repellent film 14 is compressed, without deforming, to the air electrode 15 by uniform pressure under the applied pressure, which enables restraining damage to the water-repellent film 14. In addition, since the separator 18 is adhered to the first resin film 11, the battery can be fabricated by only stacking and adhering members after the opening forming step S2. That in turn enables streamlining manufacturing steps and achieving low cost production.

Embodiment 2

Figure 13:
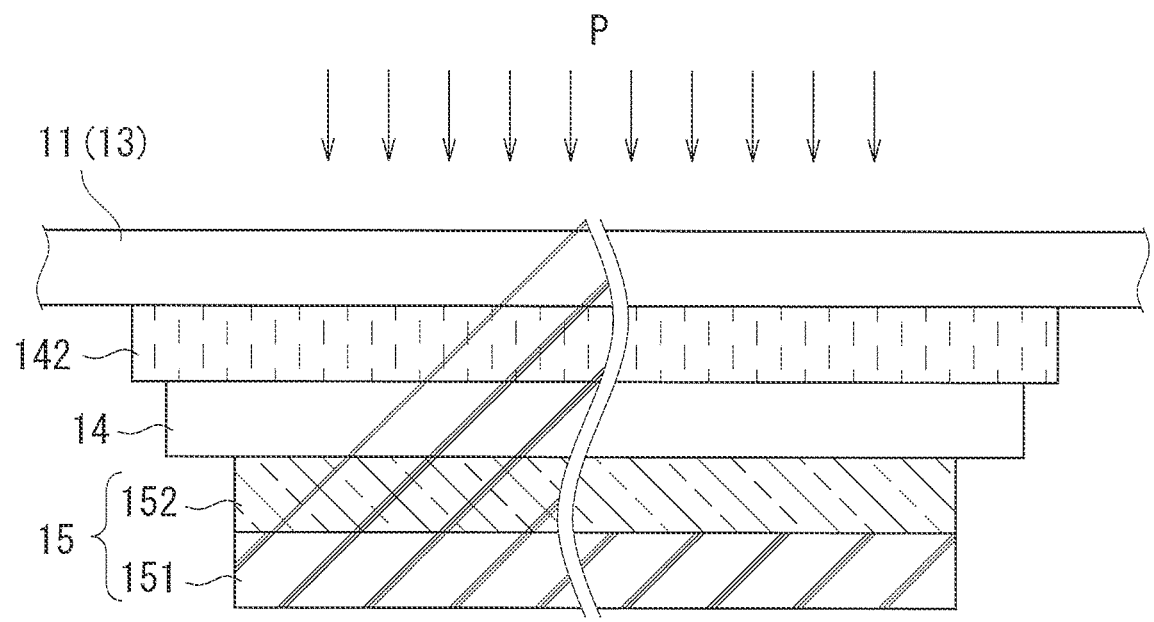
FIG. 13 is a cross-sectional diagram illustrating a method of manufacturing a metal-air battery in accordance with Embodiment 2 of the present disclosure.
Figure 14:
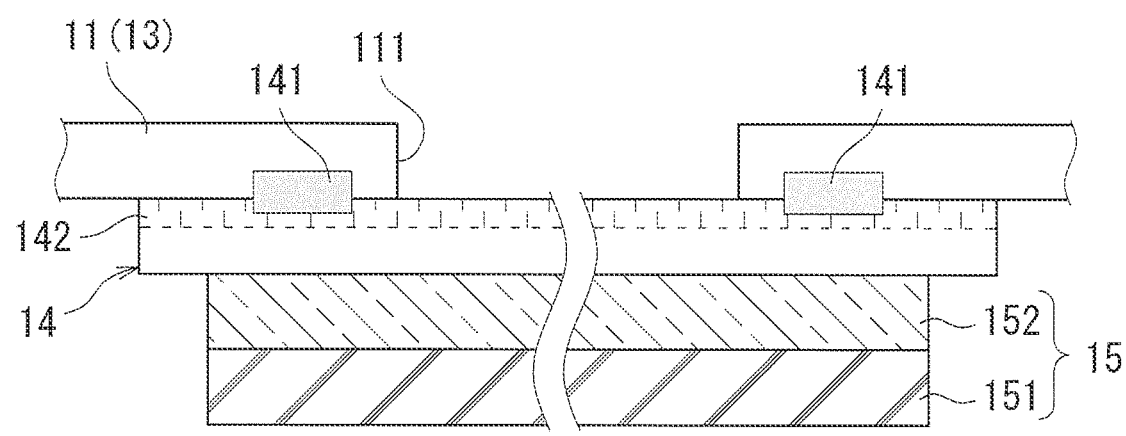
FIG. 14 is a cross-sectional diagram illustrating another example of the method of manufacturing a metal-air battery in accordance with Embodiment 2.

FIGS. 13 and 14 are schematic cross-sectional diagrams illustrating a method of manufacturing a metal-air battery 10 in accordance with Embodiment 2 of the present disclosure.

In Embodiment 1, it is only the water-repellent film 14 that is provided between the first resin film 11 and the catalyst layer 152. The method of manufacturing the metal-air battery 10 in accordance with this aspect of the present disclosure further involves the interposition of a polyolefin-based resin.

Note that the methods of manufacturing a metal-air battery in accordance with Embodiments 2 and 3 described below have a basic configuration that is common to Embodiment 1. The following description will therefore focus on differences. The other features will be indicated by the same reference numerals as in foregoing Embodiment 1, and description thereof is omitted.

As a method of manufacturing the metal-air battery 10, it is preferable to additionally interpose a polyolefin-based resin between the water-repellent film 14 and the first resin film 11. As shown in, for example, FIG. 13, in the first stacking step S1, a porous resin layer 142 of a polyolefin-based resin is disposed between the first resin film 11 and the water-repellent film 14. The porous resin layer 142 preferably contains two types of polyolefin-based resins with different melting points such as polypropylene (PP) and polyethylene (PE). More specifically, the porous resin layer 142 may be a nonwoven fabric made of a polypropylene fiber and a polyethylene fiber.

The interposition of the porous resin layer 142 of a polyolefin-based resin enables thermally fusing the porous resin layer 142 and the first resin film 11 and thermally fusing the porous resin layer 142 and the water-repellent film 14, to fuse the first resin film 11 and the water-repellent film 14 together with high adhesion strength via the porous resin layer 142.

In such a case, the water-repellent film 14 and the porous resin layer 142 may be stacked, and the water-repellent film 14 and the porous resin layer 142 be fused together in advance for use before the compression step S12 and the fusing step S11. The water-repellent film 14 and the porous resin layer 142 are preferably fused by heating from the water-repellent film 14 side.

In addition, as shown in FIG. 14, the porous resin layer 142 may be formed in a surface layer portion of the water-repellent film 14 by impregnating the water-repellent film 14 with a polyolefin-based resin in such a manner as to correspond to the fused positions of the first resin film 11 and the water-repellent film 14 before the first stacking step S1. The porous resin layer 142 in the water-repellent film 14 and the first resin film 11 are fused and adhered together to form the fusing portion 141 between these two. In such a case, the porous resin layer 142 melts with heat, but a porous region of the water-repellent film 14 therein serves as a diffusion region for air (oxygen), thereby restraining decreases in air supply efficiency.

Embodiment 3

Embodiments 1 and 2 have described methods of manufacturing a metal-air battery 10 that is either a two-electrode primary battery or a two-electrode secondary battery. Embodiment 3 will describe a preferred configuration in a case where the present disclosure is applied to a three-electrode secondary battery having two positive electrodes and a metal negative electrode.

Figure 15:
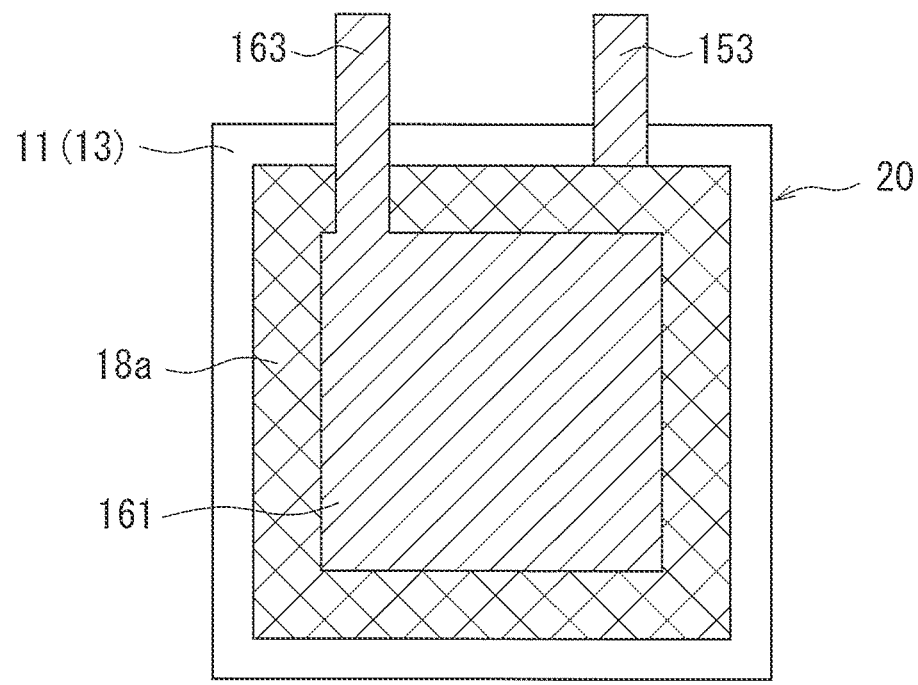
FIG. 15 is a plan diagram illustrating a method of manufacturing a metal-air battery in accordance with Embodiment 3 of the present disclosure.
Figure 16:
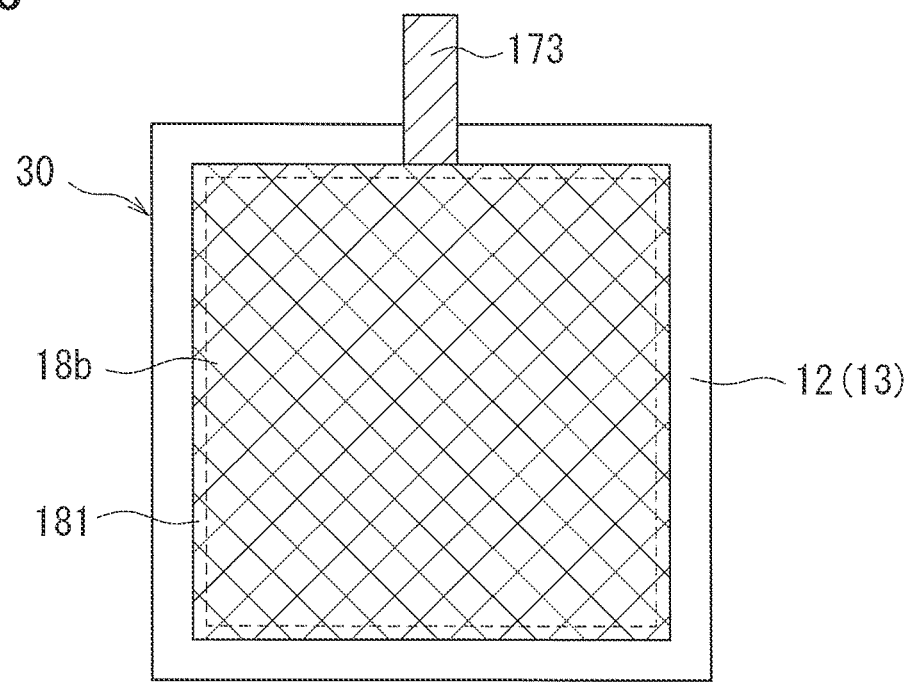
FIG. 16 is a plan diagram illustrating the method of manufacturing a metal-air battery in accordance with Embodiment 3.
Figure 17A:
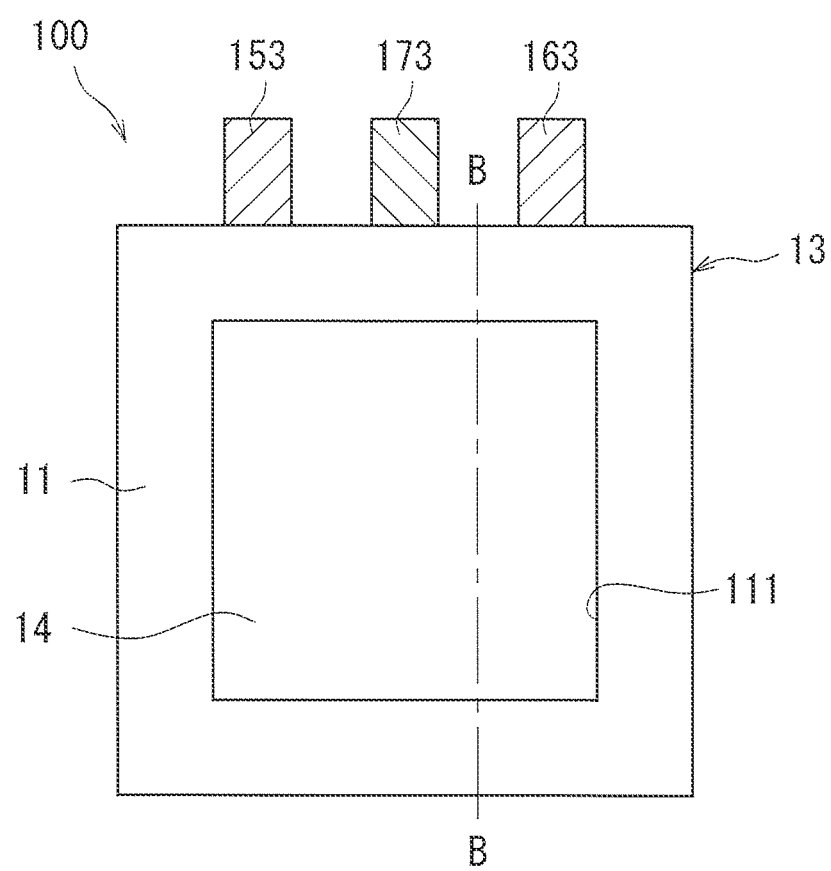
FIG. 17A is a plan diagram of an example of a metal-air battery manufactured by the method.
Figure 17B:
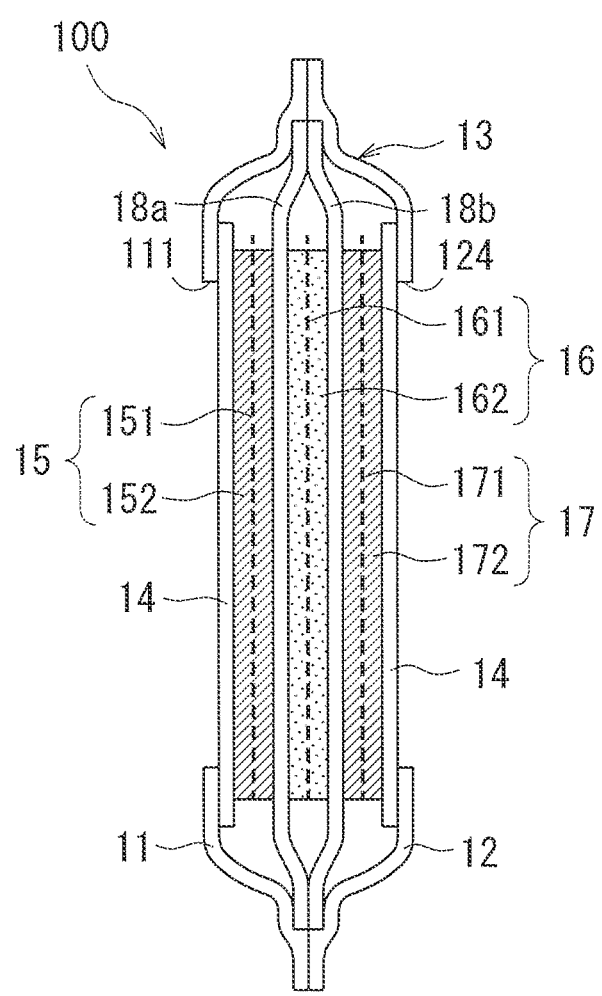
FIG. 17B is a cross-sectional view taken along line B-B in FIG. 17A.
Figure 18A:
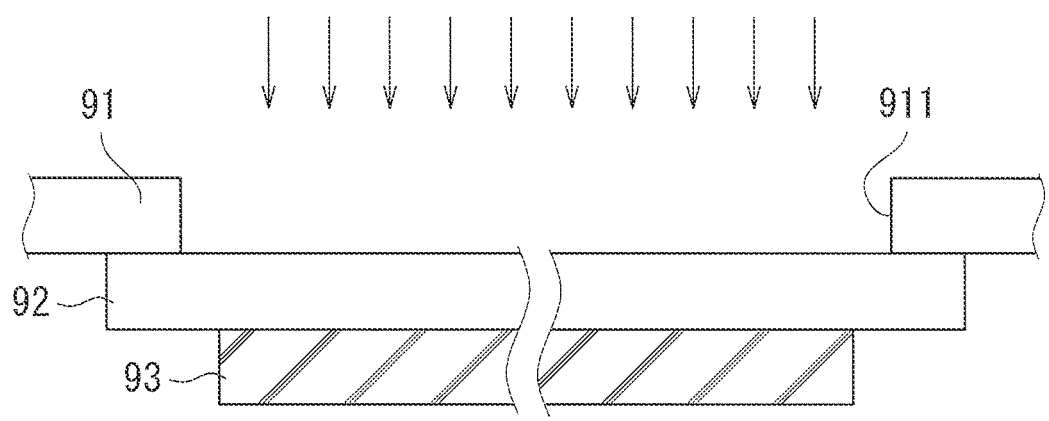
FIG. 18A is a cross-sectional diagram illustrating a conventional method of manufacturing a metal-air battery.
Figure 18B:
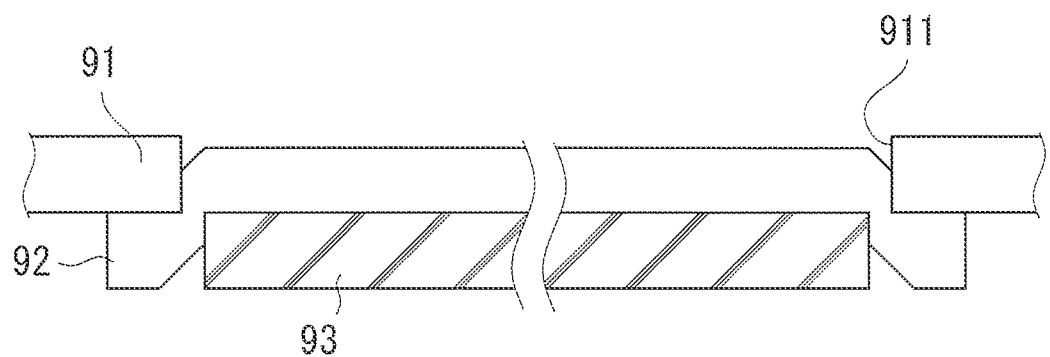
FIG. 18B is a cross-sectional diagram of an opening of a metal-air battery manufactured by the conventional method.

FIGS. 15 and 16 illustrate a method of manufacturing a metal-air battery in accordance with Embodiment 3 of the present disclosure. FIGS. 17A and 17B illustrate an example of a metal-air battery manufactured by the method of manufacturing a metal-air battery in accordance with the present disclosure. Embodiment 3 discusses as an example the present disclosure being applied to a three-electrode metal-air battery 100 having: a metal negative electrode 16; and an air electrode 15 and a charge electrode 17 as the two positive electrodes.

Referring to FIG. 15, a first structural member 20 is fabricated, as a method of manufacturing the metal-air battery 100, through the same steps as the steps from the first stacking step S1 through the second stacking step S3 disclosed in Embodiment 1. The first structural member 20 shown in FIG. 15 and that shown in FIG. 9 have a common structure including: the air electrode (first positive electrode) 15 including an oxygen-reducing catalyst layer 152; and the metal negative electrode 16. In addition, the first structural member 20 is provided with an air inlet (first opening) 111 in a first resin film (first exterior body) 11 in the opening forming step S2 after the fusing step S11 (first fusing step) and the compression step S12 (first compression step) in the first stacking step S1. The current collector 161 of the metal negative electrode 16 is stacked on a separator 18a adhered to the first resin film 11.

In contrast, a second structural member 30 shown in FIG. 16 includes the charge electrode (second positive electrode) 17 including an oxygen-generating catalyst layer 172. The charge electrode 17 includes a positive-electrode current collector 171 in contact with the catalyst layer 172. When the positive-electrode current collector 171 contains an oxygen-generating metal such as Ni, the catalyst layer 172 may be omitted. This second structural member 30 can be fabricated by performing the first stacking step S1 including the fusing step S11 and the compression step S12 and also performing the opening forming step S2, as shown in FIG. 1. A water-repellent film (second water-repellent film) 14 and the catalyst layer 172 and the positive-electrode current collector 171 in the charge electrode 17 are disposed between a separator 18b and a second resin film (second exterior body) 12 (see FIG. 17B).

Regarding the second structural member 30, in the fusing step S1, the second resin film 12, which is a part of a battery container 13, and the water-repellent film 14 are placed one on top of the other and fused together (second fusing step). In the second fusing step, similarly to the first fusing step, the overlapping portions of the second resin film 12 and the water-repellent film 14 are fused in a frame shape. The water-repellent film 14, the oxygen-generating, sheet-like catalyst layer 172, and the positive-electrode current collector 171 are stacked in this order and compressed in the compression step S12 (second compression step). Thereafter, as the opening forming step S2, a rectangular portion of an internal region of the frame-shaped fusing portion of the second resin film 12 is removed to form an air outlet (second opening) 124 in the second resin film 12. Next, the separator 18b is stacked on the charge electrode 17 and fused to the second resin film 12, to fabricate the second structural member 30.

Hence, the air inlet 111 is provided on a side of the first resin film 11 opposite the air electrode 15 in the first structural member 20, and the air outlet 124 is provided on a side of the second resin film 12 opposite the charge electrode 17 in the second structural member 30. The second structural member 30 is provided by extending a lead portion 173 of the charge electrode 17 out of the second resin film 12.

Next, the current collector 161 on the first structural member 20 side and the separator 18b on the second structural member 30 side are placed one on top of the other to stack the first structural member 20 and the second structural member 30. Thereafter, as the first sealing step S4, the first resin film 11 on the first structural member 20 side and the second resin film 12 on the second structural member 30 side are sealed on three sides by fusing (see FIG. 10). Next, a negative electrode slurry is injected through an opening on the bottom side where the resin films are not fused (negative electrode slurry injection step S5). The negative electrode slurry may include zinc particles and an electrolytic solution.

Next, as the second sealing step (second step) S6, the bottom side, through which the negative electrode slurry was injected, is fused to seal the first resin film 11 and the second resin film 12. Hence, the battery container 13 is integrally formed to obtain the metal-air battery 100 shown in FIGS. 17A and 17B.

Even in this method of manufacturing the metal-air battery 100, since the water-repellent film 14 is adhered without providing the openings (the air inlet 111 and air outlet 124) in advance in the first resin film 11 and the second resin film 12 which are parts of the exterior body, and the openings are thereafter formed, the metal-air battery 100 can be fabricated without damaging the water-repellent film 14. In addition, the first structural member 20 and the second structural member 30 can be individually prepared, and the battery can be fabricated by only stacking and adhering these structural members. That in turn enables streamlining manufacturing steps and achieving low cost production.

Note that the configuration in accordance with the present disclosure is also applicable to a metal-air battery including two air electrodes and a metal negative electrode between the two air electrodes. In such a case, as a method of manufacturing a metal-air battery, the two positive electrodes (first and second positive electrodes) are not necessarily capable of reducing and generating oxygen respectively, and the two positive electrodes may both include an oxygen-reducing catalyst layer. In addition, the oxygen-reducing catalyst layer may be replaced with a catalyst layer containing both an oxygen-reducing catalyst and an oxygen-generating catalyst or by a catalyst layer containing an oxygen-reducing and -generating catalyst. A secondary battery can be constructed by arranging a metal-air battery including such a catalyst layer(s).

The method of manufacturing a metal-air battery in accordance with the present disclosure is capable of fusing a resin film or a like exterior body and a water-repellent film in the fusing step without damaging the water-repellent film and allows for thereafter providing an opening in the exterior body, thereby reliably preventing leakage of the electrolytic solution through the opening. That in turn prevents the level of the electrolytic solution from decreasing in the metal-air battery, thereby restraining decreases in battery capacity.

The present invention may be implemented in various forms without departing from its spirit and main features. Therefore, the aforementioned examples are for illustrative purposes only in every respect and should not be subjected to any restrictive interpretations. The scope of the present invention is defined only by the claims and never bound by the specification. Those modifications and variations which may lead to equivalents of claimed elements are all included within the scope of the invention.

The present application claims the benefit of priority to Japanese Patent Application No. 2020-119407 filed on Jul. 10, 2020, the entire contents of which are incorporated herein by reference.

REFERENCE SIGNS LIST 10, 100 Metal-air Battery
11 First Resin Film (First Exterior Body)
111 Air Inlet (Opening, First Opening)
12 Second Resin Film (Second Exterior Body)
124 Air Outlet (Opening, Second Opening)
13 Battery Container (Exterior Body)
14 Water-repellent Film (First Water-repellent Film, Second Water-repellent Film)
141 Fusing Portion
142 Porous Resin Layer
Air Electrode (Positive Electrode, First Positive Electrode)
151 Positive-electrode Current Collector
152 Catalyst Layer
153 Lead Portion
16 Metal Negative Electrode
161 Current Collector
162 Active Material Layer
163 Lead Portion
17 Charge Electrode (Positive Electrode, Second Positive Electrode)
171 Positive-electrode Current Collector
172 Catalyst Layer
173 Lead Portion
18, 18a, 18b Separator
181 Adhesion Region
20 First Structural Member
30 Second Structural Member

The invention claimed is:

1. A method of manufacturing a metal-air battery, the method comprising a first step of stacking an exterior body, a water-repellent film, and a positive electrode in a stated order,
   the first step comprising:
      a fusing step of fusing the exterior body and the water-repellent film; and
      a compression step of compressing the water-repellent film and the positive electrode,
   the fusing step fusing, in a frame shape, a region of the exterior body and the water-repellent film where the exterior body and the water-repellent film overlap, and
   the method comprising, after the first step, an opening forming step of forming an opening in the exterior body by removing a part of the exterior body from inside a frame-shaped fusing portion formed in the fusing step.

2. The method according to claim 1, wherein the positive electrode includes a catalyst layer capable of reducing oxygen.

3. The method according to claim 1, further comprising a sealing step of sealing the exterior body.

4. The method according to claim 3, wherein
   the exterior body includes a first exterior body and a second exterior body,
   the water-repellent film includes a first water-repellent film and a second water-repellent film,
   the positive electrode includes a first positive electrode and a second positive electrode,
   the first step stacks the first exterior body, the first water-repellent film, and the first positive electrode in a stated order and stacks the second exterior body, the second water-repellent film, and the second positive electrode in a stated order,
   the fusing step comprises:
      a first fusing step of fusing the first exterior body and the first water-repellent film; and
      a second fusing step of fusing the second exterior body and the second water-repellent film, the compression step comprises:
- a first compression step of compressing the first water-repellent film and the first positive electrode; and
- a second compression step of compressing the second water-repellent film and the second positive electrode, the first fusing step fuses, in a frame shape, a region of the first exterior body and the first water-repellent film where the first exterior body and the first water-repellent film overlap, the second fusing step fuses, in a frame shape, a region of the second exterior body and the second water-repellent film where the second exterior body and the second water-repellent film overlap, the opening forming step comprises, after the first step, an opening forming step of forming a first opening and a second opening in the first exterior body and the second exterior body by removing a part of the first exterior body and a part of the second exterior body respectively from inside the frame-shaped fusing portion formed in the fusing step, and additionally, the sealing step seals the first exterior body and the second exterior body.

5. The method according to claim 4, wherein
the first positive electrode is an air electrode capable of reducing oxygen, and
the second positive electrode is a charge electrode capable of generating oxygen.

6. The method according to claim 1, wherein the positive electrode includes a positive-electrode current collector in contact with the catalyst layer.

7. The method according to claim 6, wherein the compression step stacks the water-repellent film, the catalyst layer, and the positive-electrode current collector in a stated order and compresses the water-repellent film, the catalyst layer, and the positive-electrode current collector.

8. The method according to claim 6, wherein the catalyst layer and the positive-electrode current collector are compressed in advance before the first step.

9. The method according to claim 1, wherein before the first step, the water-repellent film is impregnated with a polyolefin-based resin in such a manner as to correspond to the fused region of the exterior body and the water-repellent film.

10. The method according to claim 1, wherein the first step interposes a porous resin layer containing a polyolefin-based resin between the exterior body and the water-repellent film.

11. The method according to claim 10, wherein the water-repellent film and the porous resin layer are stacked in advance by fusing the water-repellent film and the porous resin layer.

12. The method according to claim 11, wherein the water-repellent film and the porous resin layer are fused by heating from a water-repellent film side.

13. The method according to claim 1, wherein
the exterior body includes an opening-providable region that is removable,
the fusing step fuses the exterior body and the water-repellent film outside the opening-providable region,
the compression step compresses a portion including the opening-providable region, and
the opening forming step removes the exterior body in the opening-providable region.

* * * * *